(12) United States Patent
Larson, Jr.

(10) Patent No.: US 9,296,487 B2
(45) Date of Patent: Mar. 29, 2016

(54) AUTOMATIC DISTRIBUTED HEATING SYSTEM FOR A RAM AIR TURBINE POWER TRAIN

(75) Inventor: Michael E. Larson, Jr., Rockford, IL (US)

(73) Assignee: Hamilton Sunstrand Corporation, Windsor Locks, CT (US)

(*) Notice: Subject to any disclaimer, the term of this patent is extended or adjusted under 35 U.S.C. 154(b) by 728 days.

(21) Appl. No.: 13/588,950

(22) Filed: Aug. 17, 2012

(65) Prior Publication Data

US 2014/0050582 A1 Feb. 20, 2014

(51) Int. Cl.
*F01D 25/10* (2006.01)
*B64D 41/00* (2006.01)

(52) U.S. Cl.
CPC ............... *B64D 41/007* (2013.01); *Y02T 50/44* (2013.01)

(58) Field of Classification Search
CPC .................................................... B64D 41/007
See application file for complete search history.

(56) References Cited

U.S. PATENT DOCUMENTS

| | | | | |
|---|---|---|---|---|
| 4,578,019 A * | 3/1986 | Safarik | ............................. | 416/1 |
| 4,742,976 A * | 5/1988 | Cohen | .............................. | 244/58 |
| 5,174,719 A * | 12/1992 | Walsh et al. | .................. | 416/142 |
| 6,593,547 B1 * | 7/2003 | Raad | ............................. | 219/201 |
| 8,360,715 B2 * | 1/2013 | Matsuo et al. | ................. | 415/176 |
| 8,575,900 B2 * | 11/2013 | Spierling | ........................ | 322/34 |

\* cited by examiner

*Primary Examiner* — Richard Edgar
*Assistant Examiner* — Brian O Peters
(74) *Attorney, Agent, or Firm* — Stephen G. Mican

(57) ABSTRACT

A distributed heating system for a power train of a ram air turbine, which ram air turbine has a stowed position and a deployed position, has at least one electrical resistance heater element, with each electrical resistance heater element located proximate at least one respective lubrication surface for the power train; and an electrical controller for coupling electrical power to each electrical resistance heater element when the ram air turbine is in the stowed position and ambient temperature falls below a desired level.

20 Claims, 3 Drawing Sheets

AUTOMATIC DISTRIBUTED HEATING SYSTEM FOR A RAM AIR TURBINE POWER TRAIN

Figure 1:
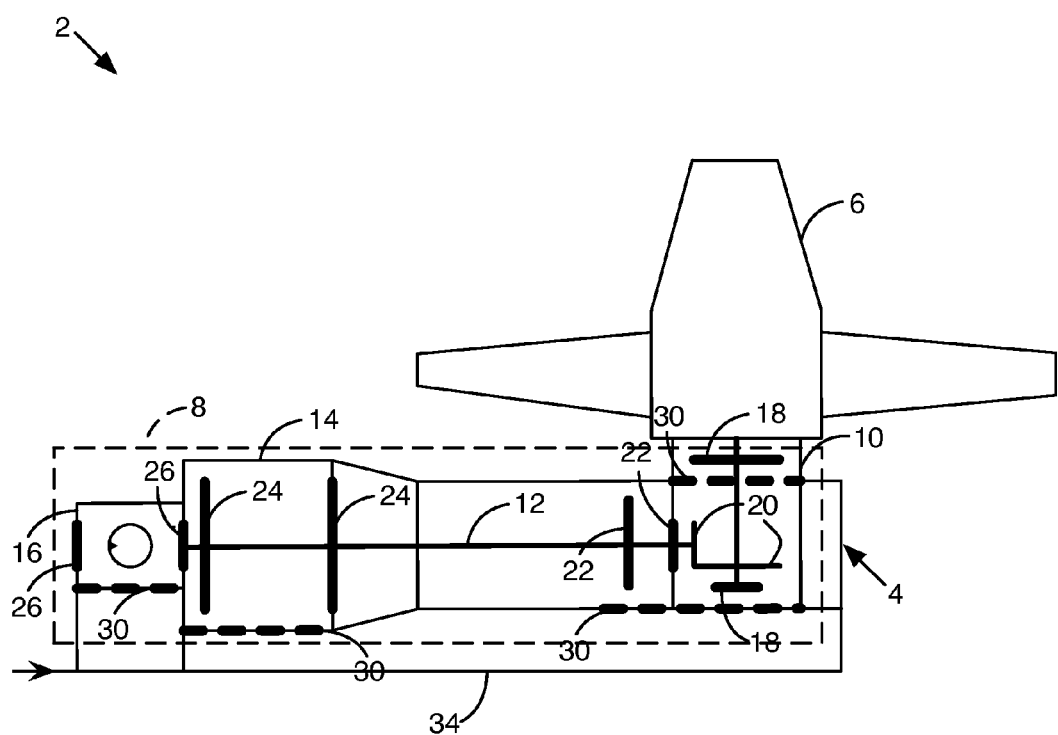
Figure 2:
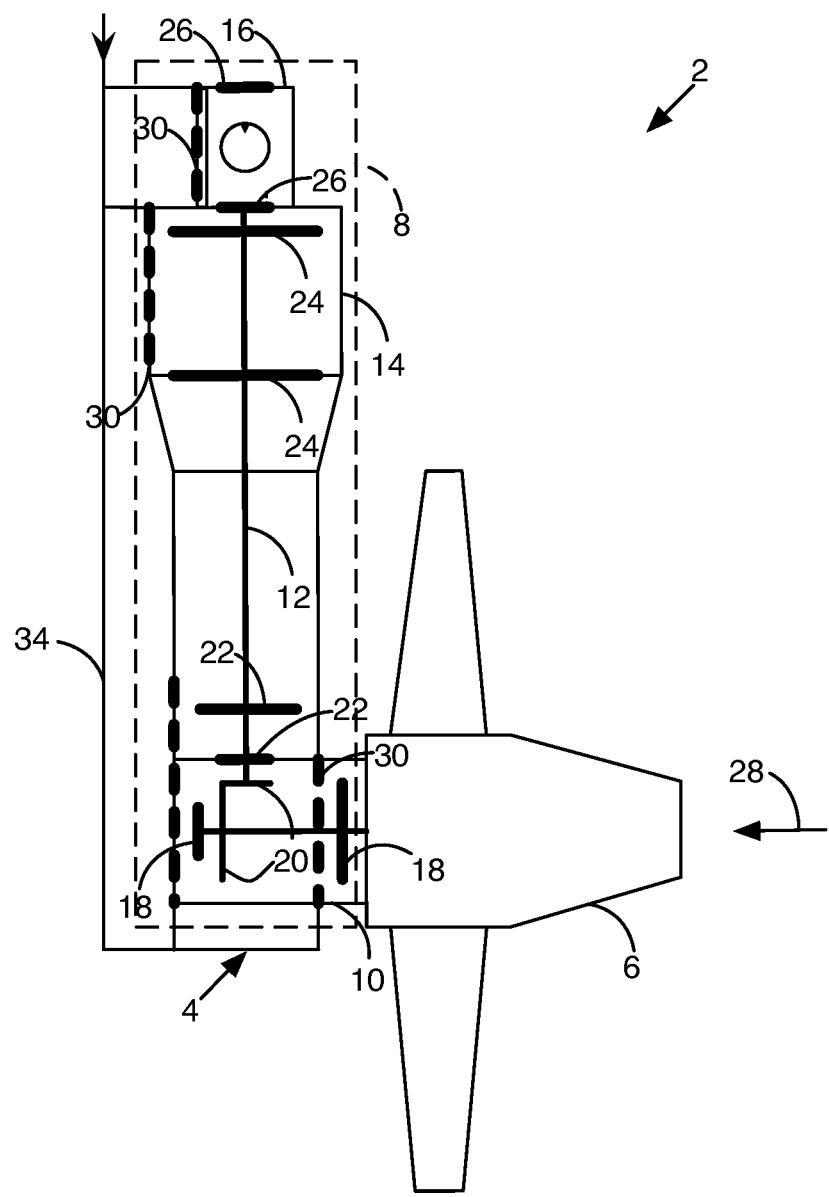
Figure 3:
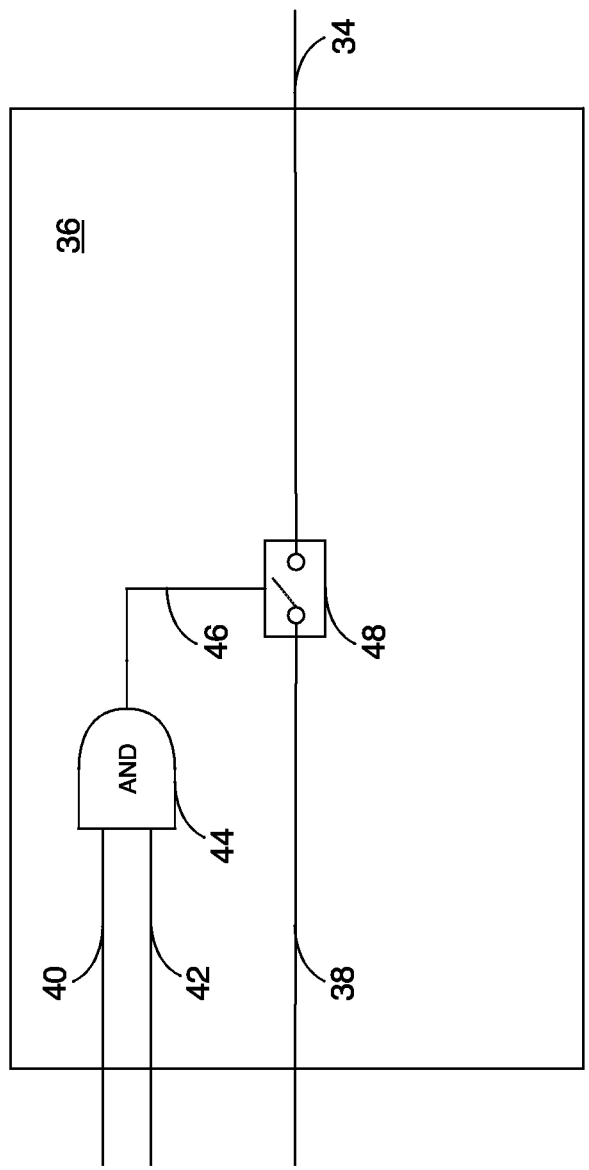

FIG. 1 is a schematic side view of a ram air turbine in a stowed position with a distributed heating assembly according to a possible embodiment. FIG. 2 is a schematic side view of the ram air turbine of FIG. 1 in a deployed position. FIG. 3 is a schematic diagram of an electrical controller for automatic engagement of the distributed heating assembly for the ram air turbine shown in FIGS. 1 and 2.

FIG. 1 is a schematic side view of a ram air turbine 2 in a stowed position with a distributed heating assembly 4 for a distributed heating system according to a possible embodiment. FIG. 2 is a schematic side view of the ram air turbine 2 in a deployed position. The ram air turbine 2 comprises a turbine assembly 6 that couples to a power train 8. The power train 8 may comprise various components, such as a gear box 10 coupled to a drive line 12 that in turn couples to power accessories, such as an electrical generator 14 and a hydraulic pump 16.

The components in the power train 8 have parts with lubrication surfaces lubricated by lubricants such as oil or grease. For instance, the gear box 10 has gear box bearings 18 and gears 20, each with lubrication surfaces. The drive line 12 has drive line bearings 22 with lubrication surfaces. The electrical generator 14 has generator bearings 24 with lubrication surfaces. Finally, the hydraulic pump 16 has pump bearings 26 with lubrication surfaces.

In service, the ram air turbine 2 may be subject to a wide ambient temperature range that may reach temperatures as low as negative sixty-five degrees Fahrenheit. Such low ambient temperatures may cause a severe increase in viscosity of lubricants used for the parts of components in the power train 8 that have lubrication surfaces, such as the gear box bearings 18, the gears 20, the drive line bearings 22, the generator bearings 24 and the pump bearings 26. Upon deployment, the ram air turbine 2 shifts from the stowed position as shown in FIG. 1 to a deployed position as shown in FIG. 2. In the deployed position, an air stream 28 causes a rotational force on the turbine assembly 6. The turbine assembly 6 in turn applies a rotational force on the power train 8.

However, the parts of components in the power train 8 that have lubrication surfaces, for example, such as lubrication surfaces of the gear box bearings 18, the gears 20, the drive line bearings 22, the generator bearings 24 and the pump bearings 26, use lubricants that acquire a high degree of viscosity when exposed to low ambient temperature, which viscosity seriously increases the break away torque of the power train 8. Since the turbine assembly 6 must overcome this increased break away torque during low ambient temperature conditions, the turbine assembly 6 must be larger than would otherwise be necessary if the lubricants were not exposed to such low ambient temperature.

To counteract the change in viscosity of the lubricants when the ram air turbine 2 is in service, the distributed heating assembly 4, which comprises at least one electrical resistance heater element 30, heats a section of the power train 8 proximate at least one of its lubrication surfaces when the ram air turbine 2 is in the stowed position, as shown in FIG. 1, and the ambient temperature drops below a desired temperature, such as thirty-five degrees Fahrenheit. FIG. 1 shows an embodiment with multiple electrical resistance heater elements 30 that each heat a section of the power train 8 proximate at least one of the lubrication surfaces for parts of its components.

Each electrical resistance heater element 30 may be of the resistance wire type or the flexible circuit type, such as a flexible circuit type of electrical resistance heater element as manufactured by Tayco Engineering, Inc. Each electrical resistance heater element 30 may mount along the power train 8 in an area proximate at least one of the lubrication surfaces of parts of components in the power train 8 when the ram air turbine 2 is in the stowed position. Each electrical resistance heater element 30 may rest on or within any internal surface of the components of the power train 8, such as on or within any of the internal surfaces of the gear box 10, the drive line 12, the electrical generator 14 and the hydraulic pump 16.

The distributed heating assembly 4 also comprises an electrical wiring line 34 couples to each electrical resistance heater element 30 to feed electrical power through the electrical wiring line 34 to each electrical resistance heater element 30, which electrical power may be of the alternating current or direct current type. The distributed heating assembly 4 thus comprises the combination of each electrical resistance heater element 30 and the electrical wiring line 34.

FIG. 3 is a schematic diagram of an electrical controller 36 for automatic engagement of the distributed heating assembly 4 for the ram air turbine 2 shown in FIGS. 1 and 2. The electrical controller 36 receives electrical power from an electrical power supply line, an ambient temperature signal from an ambient temperature signal line and a ram air turbine deployment signal from a deployment signal line. The electrical controller 36 monitors the ambient temperature signal and the ram air turbine deployment signal when the ram air turbine 2 is in service.

When the electrical controller 36 detects that the ambient temperature signal has a level less than the desired level of temperature and at the same time the ram air turbine deployment signal indicates that the ram air turbine 2 is in the stowed position, the electrical controller 36 transfers power from the electrical power supply line 38 to the electrical wiring line 34 of the distributed heating assembly 4 to energise each electrical resistance heater element 30 of the distributed heating assembly 4. The energisation of each electrical resistance heater element 30 in turn heats each respective area of the power train 8 to which it mounts, thereby heating the lubricants for the lubrication surfaces of proximate parts of components in the power train 8 to a temperature sufficient to reduce viscosity of the lubricants to a satisfactorily low level.

When the electrical controller 34 detects that the ambient temperature signal has a level greater than or equal to the desired level of temperature or that the ram air turbine deployment signal indicates that the ram air turbine 2 is in the deployed position, the electrical controller 36 blocks power from the electrical power supply line 38 from reaching the electrical wiring line 34 of the distributed heating assembly 4, thus keeping each electrical resistance heater element 30 of the distributed heating assembly 4 de-energised.

If the ambient temperature signal and the ram air turbine deployment signal are both digital, with the ambient temperature signal logic 1 representing temperature less than the desired level of ambient temperature and with the ram air turbine deployment signal logic 1 representing the deployed position, a simple AND gate 44 may produce a logic 1 output signal on an output line 46 that operates a control gate 48 to transfer power from the electrical power supply line 38 to the electrical wiring line 34 of the distributed heating assembly 4 only when the ambient temperature signal has a level less than the desired level of temperature, that is, logic 1, and at the same time the ram air turbine deployment signal indicates that the ram air turbine 2 is in the stowed position, that is, logic 1.

The distributed heating assembly 4 in combination with the electrical controller 36 form a complete distributed heating system for the ram air turbine 2 that permits the turbine assembly 6 to have a size and capacity based on temperate ambient air conditions rather than worst case adverse ambient air conditions, thereby reducing weight, size and cost of the ram air turbine 2. Furthermore, the reduced viscosity of the lubricants will enhance lubrication of the parts of components in the power train 8 that have lubrication surfaces, such as the gear box bearings 18, the gears 20, the drive line bearings 22, the generator bearings 24 and the pump bearings 26, thus extending the life of the ram air turbine 2, as well as provide more consistent deployment times for the ram air turbine 2. The described embodiments as set forth herein represents only some illustrative implementations of the invention as set forth in the attached claims. Changes and substitutions of various details and arrangement thereof are within the scope of the claimed invention.

The invention claimed is:

1. A distributed heating system for a power train of a ram air turbine, which ram air turbine has a stowed position and a deployed position, comprising:
    multiple electrical resistance heater elements, with each electrical resistance heater element mounted on lubrication surfaces for the power train; and
    an electrical controller that directs power to energize each electrical resistance heater element to heat the lubricant to a temperature that reduces the viscosity of the lubricant in order to enhance lubrication of the power train;
    the electrical resistance heater elements being energized when the ram air turbine is in the stowed position and ambient temperatures causes the viscosity of the lubricant to be above acceptable levels.

2. The distributed heating system of claim 1, wherein the power train comprises a gear box with bearings and a gear set.

3. The distributed heating system of claim 1, wherein the power train comprises a drive line.

4. The distributed heating system of claim 1, wherein the power train comprises an electrical generator.

5. The distributed heating system of claim 1, wherein the power train comprises a hydraulic pump.

6. The distributed heating system of claim 1, wherein each lubrication surface comprises a lubrication surface of bearings in the power train.

7. The distributed heating system of claim 1, wherein each lubrication surface comprises a lubrication surface of gears in the power train.

8. The distributed heating system of claim 1, wherein each electrical resistance heater element is of the flexible circuit type.

9. The distributed heating system of claim 1, wherein each electrical resistance heater element is of the resistance wire type.

10. The distributed heating system of claim 1, wherein each electrical resistance heater element mounts along a surface of the power train proximate at least one respective lubrication surface for the power train.

11. The distributed heating system of claim 1, wherein the electrical controller receives the electrical power from an electrical power supply line, couples the electrical power to each electrical resistance heater unit by means of an electrical wiring line, monitors an ambient temperature signal that it receives from an electrical temperature signal line and monitors a ram air turbine deployment signal that it receives from a deployment signal line.

12. A distributed heating system for a power train of a ram air turbine, which ram air turbine has a stowed position and a deployed position, comprising:
    multiple electrical resistance heater elements, with each electrical resistance heater element mounted along a surface of the power train proximate at least a respective one of multiple lubrication surfaces for the power train;
    an electrical wiring line to interconnect each electrical resistance heater element; and
    an electrical controller that monitors an ambient temperature signal received from a temperature signal line and a ram air turbine deployment signal received from a deployment signal line for coupling electrical power received from an electrical power supply line to the electrical wiring line to feed the electrical power to each electrical resistance heater element to heat a section of the power train proximate at least the respective one of its lubrication surfaces to a temperature that reduces the viscosity of the lubricant in order to enhance lubrication of the power train when the ram air turbine is in the stowed position and ambient temperatures causes the viscosity of the lubricant to be above acceptable levels.

13. The distributed heating system of claim 12, wherein the power train comprises a gear box with bearings and a gear set.

14. The distributed heating system of claim 12, wherein the power train comprises a drive line.

15. The distributed heating system of claim 12, wherein the power train comprises an electrical generator.

16. The distributed heating system of claim 12, wherein the power train comprises a hydraulic pump.

17. The distributed heating system of claim 12, wherein each lubrication surface comprises a lubrication surface of bearings in the power train.

18. The distributed heating system of claim 12, wherein each lubrication surface comprises a lubrication surface of gears in the power train.

19. The distributed heating system of claim 12, wherein each electrical resistance heater element is of the flexible circuit type.

20. The distributed heating system of claim 12, wherein each electrical resistance heater element is of the resistance wire type.

* * * * *